United States Patent Office 3,486,900
Patented Dec. 30, 1969

3,486,900
DIAZOTYPE MATERIAL
Takahiro Tsunoda and Tsuguo Yamaoka, Funabashi-shi, and Kohei Itano and Haruo Hori, Tokyo, Japan, assignors to Keuffel & Esser Company, Hoboken, N.J., a corporation of New Jersey
Filed June 1, 1966, Ser. No. 554,532
Claims priority, application Japan, June 2, 1965, 40/32,178
Int. Cl. G03c 1/54
U.S. Cl. 96—91                    10 Claims

ABSTRACT OF THE DISCLOSURE

Diazotype materials having faster light-decomposition rates and broader wave length band light-sensivity comprise 1-pyrene diazonium compounds.

---

Figure 1:
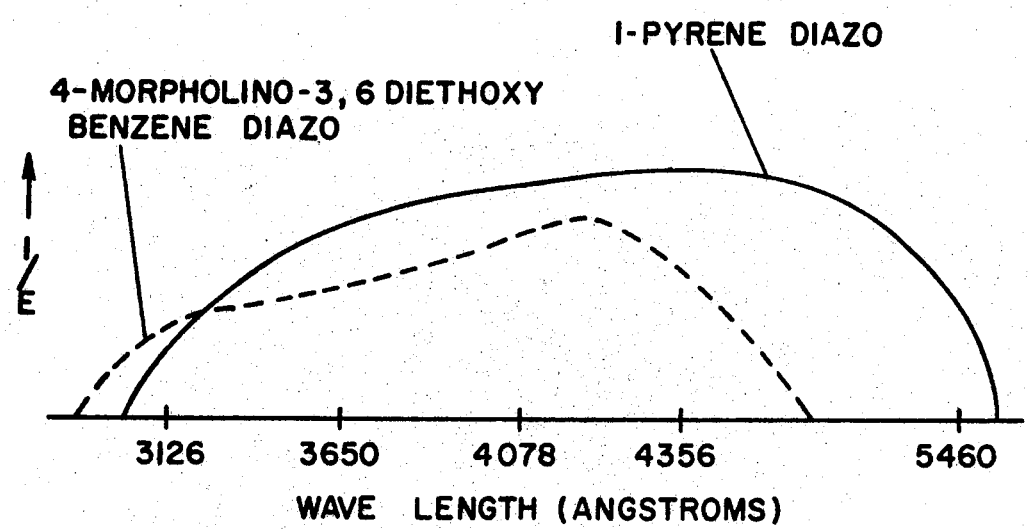

This invention relates to improved diazo positive reproduction material comprising, as a light-sensitive component, a novel pyrene diazonium compound.

Conventionally, a variety of diazo compounds have been used for the production of diazo positive reproduction materials, but the use of the pyrene-diazonium salts of the present invention has never been proposed and is novel.

The compounds to be used in the process for producing diazo positive reproduction materials of the present invention are represented by the general formula

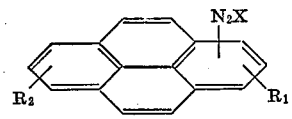

wherein $R_1$, and $R_2$ are individually one member selected from the class consisting of hydrogen, nitro, halogen, amino, monoalkylamino, acylalkylamino, diakylamino, hydroxyl, alkoxy and sulfone groups, and X is an anion group.

The compounds of the present invention have a pyrene nucleus as the basic structural element and as a result their photo-decomposition wave length moves to a markedly long wave length side as compared with that of compounds having a conventionally known nucleus, for example, 4-morpholino-3,6-diethoxy-benzene diazonium chloride. That is, in the case of compounds having a benzene nucleus, the photo-decomposition wave length is about 3600–3800 A.U., whereas in the case of the compounds employed in the present invention, the range extends between about 3600–5000 A.U.

The present compounds, therefore, are well sensitive not only to a mercury lamp employed in the ordinary diazo positive reproduction, but also to sunlight, with the result that the energy of light source for printing is effectively utilized to make it possible to sufficiently shorten the printing time as well as to facilitate the selection of light source to be used.

The sensitive pyrenediazonium compounds to be used in the process for producing diazo positive reproduction materials in accordance with the present invention can be prepared according to ordinary synthesis process. That is, in the case of 1-pyrenediazonium zinc chloride, pyrene is subjected to nitration at 50° C. in glacial acetic acid in the presence of nitric acid having a specific gravity of 1.38 and then to hydrogenation at room temperature in the presence of a Raney nickel catalyst to form an amino body. The amino body is diazotized according to ordinary procedure and is then treated with zinc chloride, whereby a zinc chloride salt of diazo body can be obtained.

In the case of other derivatives also, synthesis process similar to the above may be employed with appropriate pyrene compounds to obtain respective diazo compounds.

Typical examples of diazo compounds usable in the present invention are cited below.

1-pyrenediazonium chloride-zinc chloride:

(I) 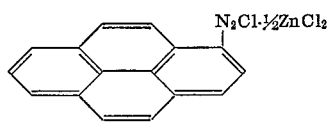

6-nitro-1-pyrenediazonium chloride-zinc chloride:

(II) 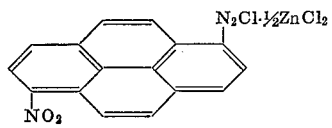

6 - dimethylamino - 1 - pyrenediazonium - boron tetrafluoride:

(III) 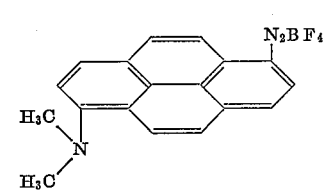

3,8-dihydroxy-1-pyrenediazonium boron tetrafluoride:

(IV) 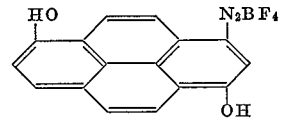

3,8-dimethoxy-1-pyrenediazonium-zinc chloride:

(V) 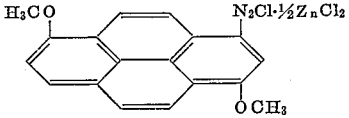

3,8-disulfo-1-pyrenediazonium chloride-zinc chloride:

(VI) 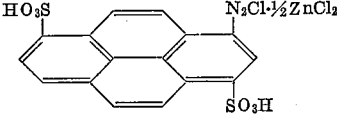

6-chloro-1-pyrenediazonium chloride-zinc chloride:

(VII) 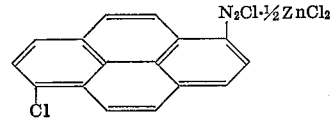

6-benzoylamino-1-pyrenediazonium chloride-zinc chloride:

(VIII) 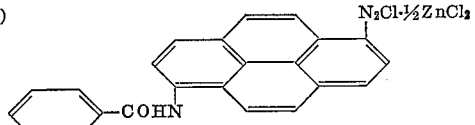

6-benzoylmethylamino-1-pyrenediazonium-boron tetrafluoride:

(IX) 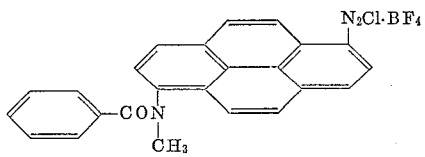

6-ethylamino-1-pyrenediazonium-zinc chloride:

(X) 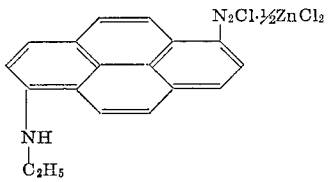

1 - pyrenediazonium - 4' - hydroxy-naphthalene-1'-sulfonate:

(XI) 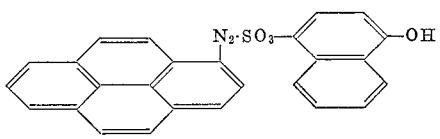

6 - dimethylamino - 1 - pyrenediazonium-6',7'-dihydroxynaphthalene-2'-sulfonate:

(XII) 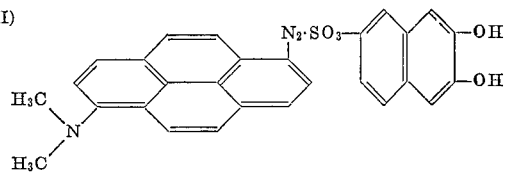

The diazo compounds of the present invention are used by dissolving or dispersing, together with any commonly used azo coupler component and other additives, in water, an organic solvent or a mixed solvent or water and an organic solvent, according to known procedure, and applying the solution or dispersion onto a paper or film support, followed by drying.

Advantageously, it is also possible to employ the pyrene diazonium compounds in the so-called one-component system diazo positive reproduction process. This is carried out by coating a support, according to the same procedure as above, with a composition composed mainly of the diazo compound of the present invention, drying the resulting coating to obtain a product, exposing the product to light and then coupling the diazo compound in a developing solution consisting chiefly of an azo dye-forming coupler component to obtain an image.

Figure 2:
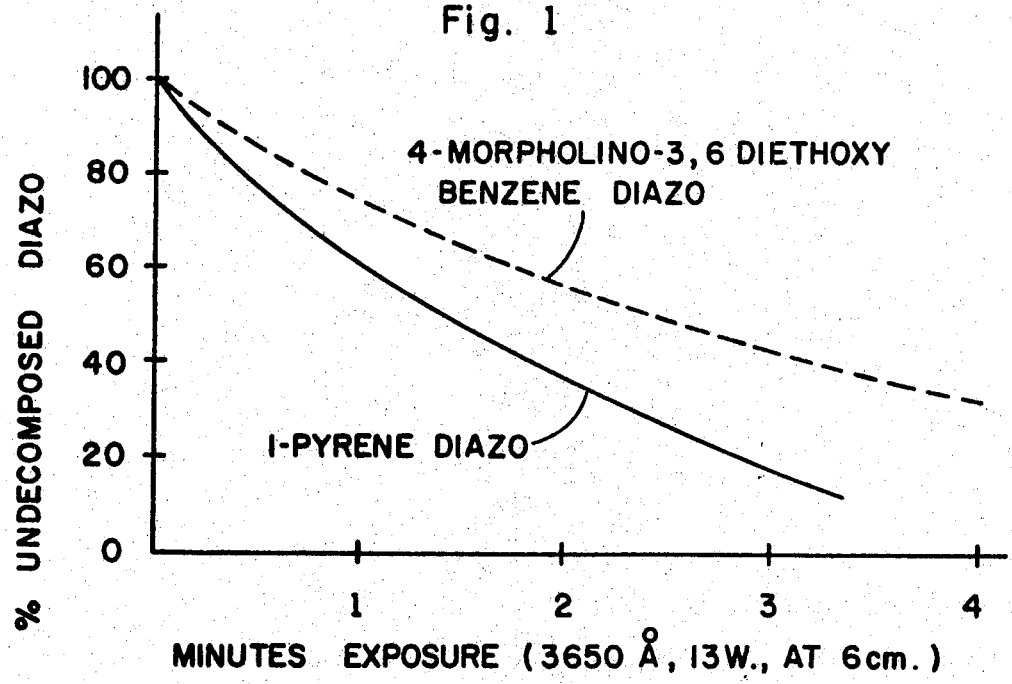

In the attached drawing, FIGURE 1 presents a graphic comparison in effective photo-decomposition wave length ranges between the pyrenediazo compound employed in the present invention and a conventional commercially available diazo compound, and FIGURE 2 is a graph showing a comparison in decomposition rate of diazo compound at 3650 A. between the pyrenediazo compound employed in the present invention and a conventional commercially available diazo compound.

The following examples are presented to further illustrate the present process for producing diazo positive reproduction materials, but it is not intended that the invention be limited thereto:

EXAMPLE 1

To white base paper (55 g./m.² commonly used for diazo positive reproduction process) a solution of the following composition is applied, as an under coating, to a thickness of about 10 g./m.² and is then dried:

| | |
|---|---|
| Colloidal silica dispersion _____ cc__ | 100 |
| Polyvinyl alcohol _____ g__ | 2 |
| Water _____ cc__ | 900 |

The dried under-coated base paper is coated with a sensitizing solution of the following composition:

| | |
|---|---|
| 1-pyrenediazonium chloride-zinc chloride double salt _____ g__ | 10 |
| Tartaric acid _____ g__ | 40 |
| Zinc chloride _____ g__ | 55 |
| Thiourea _____ g__ | 90 |
| Saponin _____ g__ | 1 |
| Sodium 2,3-hydroxynaphthalene-6-sulfonate ___ g__ | 20 |
| Alkali Violet _____ g__ | 0.1 |
| Water _____ cc__ | 1000 |

After drying the paper, the sensitized side is covered with an original image and is exposed to light by means of a common copying device provided with a mercury vapor lamp employed for diazo positive reproduction. The resulting latent image is developed with ammonia gas, whereby a clear bluish purple image is quickly obtained.

EXAMPLE 2

The same white base paper as in Example 1 is subjected to the same under coating treatment as in Example 1 and is coated with a sensitizing solution of the following composition:

| | |
|---|---|
| 6-chloro-1-pyrenediazonium chloride-zinc chloride double salt _____ g__ | 11 |
| Citric acid _____ g__ | 10 |
| Aluminum sulfate _____ g__ | 25 |
| Glycerine _____ g__ | 50 |
| Alkali Violet _____ g__ | 0.1 |
| Water _____ cc__ | 1000 |

After drying, the paper is exposed to light in the same manner as in Example 1 and is then developed with a developing solution of the following composition:

| | |
|---|---|
| 2-naphthol-3,6-disulfonic acid _____ g__ | 15 |
| Thiourea _____ g__ | 85 |
| Caustic potash _____ g__ | 15 |
| Borax _____ g__ | 40 |
| Water to make 1000 cc. | |

Reaction quickly occurs to obtain a clear purple image.

The diazonium compounds of the present invention may be advantageously employed in heat-developing diazotype materials.

EXAMPLE 3

In 100 cc. of a 1.5% ethyl acetate solution of a polyvinylidene chloride binder are charged 1.1 g. of 6-dimethylamino-1-pyrenediazonium - 6',7' - dihydroxy - naphthalene-2'-sulfonate, 4 g. of urea and 1 g. of citric acid. The mixture is pulverized in a ball mill for 48 hours to form a homogeneous fine granular mixed dispersion. This dispersion is applied onto tracing paper by means of an ordinary coating process and is then dried to obtain a diazo reproduction sheet.

This sheet is exposed to light as in Example 1 and is passed between hot rolls heated to a temperature of about 150° C. whereby the sheet is developed to obtain a clear bluish purple image.

It will be apparent that the described examples are capable of many variations and modifications which are likewise to be included within the scope of the present invention as set forth in the appended claims.

What is claimed is:

1. Diazotype material comprising a support and a light-sensitive composition coated thereon, the light-sensitive diazo component of said composition being a pyrenediazonium compound of the general formula:

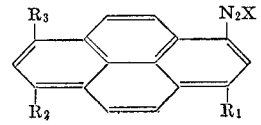

wherein
- $R_1$ is hydrogen, hydroxy, methoxy or sulfo;
- $R_2$ is hydrogen, nitro, alkylamino, chloro, benzoylamino, or benzoylalkylamino;
- $R_3$ is hydrogen, hydroxy, methoxy or sulfo; and
- X is an anion group.

2. Diazotype material according to claim 1, wherein said composition further includes an azo coupler component capable of forming a distinct dye with said diazonium compound.

3. Heat-developable diazotype material comprising material according to claim 2, and further comprising a developer compound in intimate contact with said composition, said developer compound being a heat-active alkali generator.

4. Diazotype material according to claim 1 wherein said diazonium compound is 3,8-dihydroxy-1-pyrene-diazonium-boron tetrafluoride.

5. Diazotype material according to claim 1 wherein said diazonium compound is 3,8-dimethoxy-1-pyrene-diazonium-zinc chloride.

6. Diazotype material according to claim 1 wherein said diazonium compound is 3,8-disulfo-1-pyrene-diazonium chloride-zinc chloride.

7. Diazotype material according to claim 1 wherein said diazonium compound is 6-chloro-1-pyrene-diazonium chloride-zinc chloride.

8. Diazotype material according to claim 1 wherein said diazonium compound is 6-benzoylamino-1-pyrene-diazonium chloride-zinc chloride.

9. Diazotype material according to claim 1 wherein said diazonium compound is 1-pyrene-diazonium-4'-hydroxy-naphthalene-1'-sulfonate.

10. Diazotype material according to claim 1 wherein said diazonium compound is 6-dimethylamino-1-pyrene-diazonium-6',7'-dihydroxy-naphthalene-2'-sulfonate.

References Cited

UNITED STATES PATENTS

| | | | |
|---|---|---|---|
| 2,063,631 | 12/1936 | Schmidt et al. | 96—91 XR |
| 2,679,498 | 5/1954 | Seven et al. | 96—91 XR |
| 2,727,820 | 12/1955 | Botkin et al. | 96—91 XR |
| 3,016,298 | 1/1962 | Sanders et al. | 96—91 XR |
| 3,055,801 | 9/1962 | Torgeson. | |
| 3,380,988 | 4/1968 | Rigaudy | 260—141 XR |

FOREIGN PATENTS 907,724 10/1962 Great Britain.

OTHER REFERENCES

Chem. Abstracts (I), Lund et al., "Pyrene Studies III, Aminopyrene," vol. 40.

Chem. Abstracts (III), Norman et al., "Reaction of Pyrene with Free Radicals and With Sodium," vol. 52, 11802, 1958.

Chem. Abstracts (III), Treibs et al., "Influence of a Methyl Group in Position 2 on Direct Substitution," vol. 53, 17074–17075, 1959.

NORMAN G. TORCHIN, Primary Examiner

C. BOWERS, Assistant Examiner

U.S. Cl. X.R.

96—49; 260—141, 142, 668